(12) United States Patent
Bjorn et al.

(10) Patent No.: US 8,621,642 B2
(45) Date of Patent: Dec. 31, 2013

(54) METHOD AND APPARATUS FOR AN END USER IDENTITY PROTECTION SUITE

(75) Inventors: Vance Bjorn, Atherton, CA (US); Igor Katkov, Walnut Creek, CA (US); Sergey Lipin, Palo Alto, CA (US); Fabio Santini, Mountain View, CA (US)

(73) Assignee: DigitalPersona, Inc., Redwood City, CA (US)

( * ) Notice: Subject to any disclaimer, the term of this patent is extended or adjusted under 35 U.S.C. 154(b) by 769 days.

(21) Appl. No.: 12/619,665

(22) Filed: Nov. 16, 2009

(65) Prior Publication Data

US 2010/0132043 A1 May 27, 2010

Related U.S. Application Data

(60) Provisional application No. 61/115,512, filed on Nov. 17, 2008.

(51) Int. Cl.
*G06F 7/04* (2006.01)
*G06F 17/30* (2006.01)
*G06F 11/00* (2006.01)
*G06F 12/14* (2006.01)
*G06F 12/16* (2006.01)
*G06F 15/173* (2006.01)
*H04N 7/16* (2011.01)
*G08B 23/00* (2006.01)
*H04L 29/06* (2006.01)

(52) U.S. Cl.
USPC ............... 726/26; 726/25; 713/168; 709/225

(58) Field of Classification Search
USPC .......................... 726/2, 22–26; 713/182–184
See application file for complete search history.

(56) References Cited

U.S. PATENT DOCUMENTS

| 6,941,285 | B2* | 9/2005 | Sarcanin ........................ 705/67 |
| 7,003,501 | B2* | 2/2006 | Ostroff ............................ 705/76 |
| 7,111,321 | B1* | 9/2006 | Watts et al. ....................... 726/2 |
| 7,552,467 | B2* | 6/2009 | Lindsay ............................ 726/5 |
| 7,571,473 | B1* | 8/2009 | Boydstun et al. ................ 726/21 |
| 7,581,245 | B2* | 8/2009 | Rojewski .......................... 726/6 |
| 7,685,431 | B1* | 3/2010 | Mullany ........................ 713/184 |
| 7,792,715 | B1* | 9/2010 | Kasower ......................... 705/35 |
| 7,908,659 | B2* | 3/2011 | Jeffries et al. ................... 726/25 |
| 8,086,525 | B2* | 12/2011 | Atwood et al. ................. 705/38 |
| 8,117,459 | B2* | 2/2012 | Cameron et al. .............. 713/185 |

(Continued)

FOREIGN PATENT DOCUMENTS

EP 1574929 A1 9/2005

OTHER PUBLICATIONS

PCT/US2009/064767, International Preliminary Report on Patentability, Mailed May 26, 2011, 7 pages.

(Continued)

*Primary Examiner* — Saleh Najjar
*Assistant Examiner* — Feliciano Mejia
(74) *Attorney, Agent, or Firm* — Blakely, Sokoloff, Taylor & Zafman LLP; Judith A. Szepesi

(57) ABSTRACT

A method comprising an indicator showing an overall security status of a user.

14 Claims, 15 Drawing Sheets

(56) References Cited

U.S. PATENT DOCUMENTS

| | | | |
|---|---|---|---|
| 2005/0204146 A1* | 9/2005 | Kebinger et al. | 713/182 |
| 2006/0020542 A1* | 1/2006 | Litle et al. | 705/40 |
| 2006/0218635 A1* | 9/2006 | Kramer et al. | 726/22 |
| 2007/0220614 A1 | 9/2007 | Ellis et al. | |
| 2008/0103800 A1* | 5/2008 | Domenikos et al. | 705/1 |
| 2008/0216170 A1* | 9/2008 | Sanai et al. | 726/18 |
| 2009/0300747 A1* | 12/2009 | Ahn | 726/9 |

OTHER PUBLICATIONS

PCT/US09/64767, PCT International Search Report and Written Opinion, date of mailing Jan. 13, 2010, 12 pages.

The International Search Report and the Written Opinion, PCT/US09/64767, dated Jan. 13, 2010, 9 pages.

European Patent Application No. 09826964.0, Supplementary European Search Report, Dated Sep. 18, 2012, 7 pages.

\* cited by examiner

METHOD AND APPARATUS FOR AN END USER IDENTITY PROTECTION SUITE

RELATED APPLICATION

The present application claims priority to U.S. Provisional Application Ser. No. 61/115,512 filed on Nov. 17, 2008.

FIELD OF THE INVENTION

The present invention relates to identity protection, and more particularly to providing an improved system for an identity protection suite.

BACKGROUND

As users become more active on computers, their concerns about identity protection increase. Users are concerned about the security of their digital identity. There are numerous tools to protect various aspects of identity. However, in the prior art, each of these aspects of a user's digital identity must be individually handled. The user can download anti-virus software, encryption software, and other tools to attempt to protect their system and identity.

One of the biggest concerns for users is passwords used to access accounts ranging from 401K accounts, to bank accounts, and email. Stories about users' passwords being stolen or compromised are abundant. Users want privacy of their account, but they also want convenience. With the huge numbers of accounts that most users have these days, there is often a problem with choosing passwords for each of them, and ensuring that those passwords are of sufficient complexity and changed regularly. This causes many millions of dollars of loss, to consumers as well as banks and other institutions.

SUMMARY

A method comprising providing a central dashboard through which a user can protect his or her identity is provided. The central dashboard, in one embodiment, enables centralized control of identity at various destinations.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
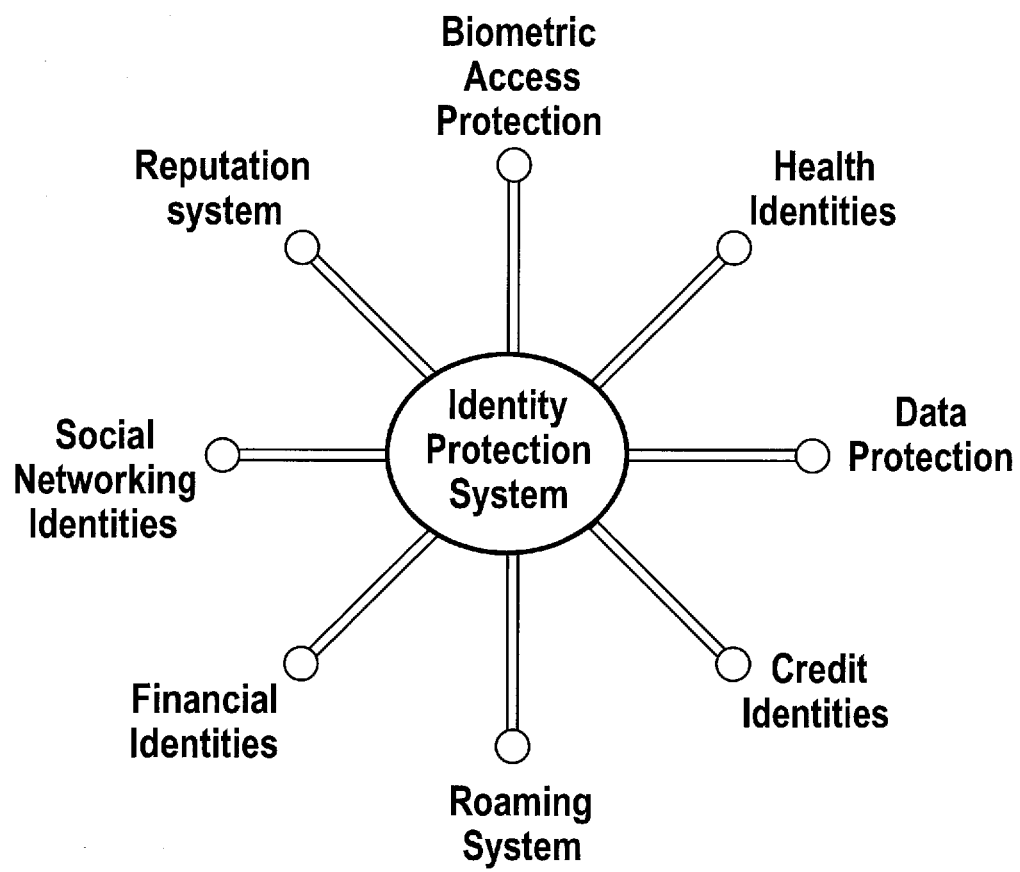
FIG. 1A is a block diagram of one embodiment of the elements which may be integrated with the identity protection suite.

The method and apparatus described is an end user identity protection suite (IPS). The IPS provides a system that enables a user to protect their identity, and provides useful feedback to the user. The identity, in one embodiment, includes multiple subtypes, such as online identities, credit identities, healthcare identities, etc. The end user may be a consumer who purchases a laptop or a corporate user who receives a computer from their employer, or a user of a shared system who has an account with the IPS. In one embodiment, the IPS is linked to the computer system.

In one embodiment, the IPS enables the user to maintain a plurality of identities, provides protection for those identities, and provides an indicator of the security of those identities. In one embodiment, the access to the identities is provided via biometric (e.g. fingerprint, iris recognition, handprint, face recognition, voice recognition, typing pattern recognition, etc.) This provides an additional level of security, by limiting access to the identity controls to the positively identified user. In another embodiment, a password, pass phrase, smart card, or a combination of biometric and one or more of the above authentication methods may be used.

In one embodiment, authentication also provides access to stored passwords via a single release mechanism. In one embodiment, the single release mechanism may be a biometric, such as a fingerprint, facial recognition, palm print, voice recognition, smart cards, etc. In one embodiment, the release mechanism may include multiple credentials (e.g. password and biometric authentication).

The method in one embodiment further comprises evaluating the plurality of passwords for strength. In one embodiment, each password in the plurality of passwords is associated with a particular website, document, application, or other computer-accessible data or service for which the user has a password or log-in. The strength of the password represents how easy it would be to crack the password. In one embodiment, the plurality of passwords is evaluated jointly and separately. The password evaluation may include one or more of: password length, password complexity, and password maturity. In one embodiment, the system further provides data on the overall strength of the plurality of passwords by evaluating password commonality across the plurality of passwords.

In one embodiment, the method also provides an interface to one or more other identity tools used evaluate the security of the user's identities. The IPS in one embodiment provides a unified tool to access and gather security status feedback from identity protection tools. The tools may include credit protection, online identity protection, data protection, health access and protection, and other tools that provide identity and/or data protection. Note that these tools are not focused on, computer security, data security, or information security on a machine. Rather, these tools are designed to secure information pertaining to identity protection which is made available, controllable, and/or accessible on or through a computer directly or through a network (e.g. the Internet, Intraweb, or other network accessible resource) or other means. In one embodiment, the system verifies the status of each of these tools (e.g. availability, utilization, etc.) and graphically displays a tool-specific security level.

In one embodiment, tools that are provided by third parties may be integrated into the system. In one embodiment, a single overall security value is calculated. In one embodiment, the single overall security value is graphically displayed to the user. In the prior art, due to the complexity of monitoring and managing security systems, such as anti-virus, encryption or similar software, and having to keep up with different systems that need to be accessed from different points and managed in dramatically different ways end users' actual level of protection was significantly different from what end users expect it to be, and what was advertised to users. The IPS solution in one embodiment provides a unified interface and management for these tools.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

FIG. 1A is a diagram of one embodiment of some of the tools which may be integrated with the identity protection suite. The diagram shows the possible aspects of an identity protection scheme which may be implemented by the IPS system. Note that the actual implementation may include only a subset of these aspects, or may include other aspects which are not shown here.

The overall "identity" may in one embodiment include various features which can include one or more of: security check, online document vault, credit monitoring, secure email and IM, parental controls/child protection, reputation system, protected access, and computer access controls. Security check verifies the strength of passwords stored in the system. Data protection enables the user to securely store documents online. Credit identities may include a credit monitoring service provided by a third party provider. The credit identities feature in one embodiment may provide a simple "safe/caution/problem" type indicator to the user.

Access protection, in one embodiment, controls access to one or more of: the IPS, the identity browser, the computer (device), and to tools, applications, and services being provided or accessed through the IPS. The access protection is biometric access protection in one embodiment. The access protection includes evaluation of the security of the user authentication being utilized. The use of a biometric is more secure than the use of a password, even a complex password. Multifactor authentication—e.g. requiring a biometric and a password or smart card, is more secure than single factor authentication. The use of biometric authentication provides a strong identity assurance by using an authentication method which binds the user's physical persona to their digital identity. The results of the validation are shown, in one embodiment, as part of the identity protection system. This enables a centralized view for the user of the relevant aspects of their identity protection system.

The reputation system in one embodiment leverages the notion of "secure user" to establish trustworthy relations over a remote connection. In one embodiment, secure users (i.e. users who use secure passwords, secure credit, secure log-on, up-to-date anti-virus protection, etc.) can leverage their trustworthiness status from being "well" protected against identity theft to convey to partners or unknown counterparts that they can rely upon the identity or information they get from these secure users. In one embodiment, the reputation system further leverages information pertaining to the online activities performed by secure users (i.e. having an active online banking account makes it more difficult to fake one's identity; having a broad network of friends in social networks makes it easier to prove one's identity or personality; having digitally signed documents makes it easier to prove facts about these documents; etc.) to further refine user's "reputation" or trustworthiness. In one embodiment, reputation system may consist of, or integrate, an external reputation system.

In one embodiment, the reputation system may be used to link the user's physical actual identity to the authentication. In one embodiment, the user's physical identity could be validated. For example, this may be done by:
 1) asking questions that only the person would know,
 2) sending a registered letter to the address with a registration code (where delivery requires an ID—thereby ensuring that only the named person gets the code, and thus linking the account with a specific person/address);
 3) requiring registration at a supervised location, such as a kiosk or office with a supervisor; and/or
 3) doing other manual background or identity checks.

Roaming system, in one embodiment provides identity roaming, which enables access and authentication from any browser and any system. In one embodiment, smart phones, or other smaller mobile devices may also be included in roaming systems. This ensures that the user can utilize fully secure passwords—because he or she can access those passwords anywhere. It further provides the user feedback regardless of which system the user is on. In one embodiment, roaming systems enable an authenticated user to access the IPS dashboard/browser from any endpoint device/tool. This, in one embodiment, includes all identities, saved passwords, and other services and tools provided through the IPS.

Health identities, credit identities, financial identities, and social networking identities are some of the facets which may be protected by the IPS. A credit identity, for example may include credit monitoring service such as the credit monitoring service provided by EXPERIAN™, one-time credit card numbers, and other credit securing and/or monitoring options. Health identities may include health records such as the ones provided by GOOGLE® or other web-based data storage, health databases, doctors' file access, etc. Social networking identities, in one embodiment include OpenID and similar identities, multiplayer gaming sites, email sites, blog sites, sales sites, etc.

These, and other features, may be all collected under the "identity protection" provided by the IPS system. By providing a centralized location where the user may verify his or her overall identity state, the user interaction is simplified. In one embodiment, the user can control, through a single interface, various features all of which work together to create a secure, and protected identity for the user.

Figure 7C:
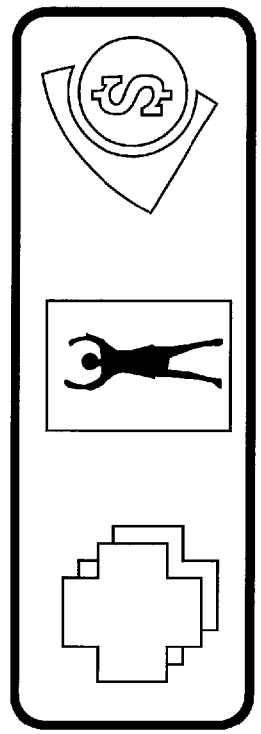
FIG. 7C is a screenshot of one embodiment of a sidebar gadget including multiple identities.
Figure 7B:
FIG. 7B is a screenshot of one embodiment of a toolbar display.

In one embodiment, a status indicator is shown to the user, showing an overall identity protection status. In one embodiment, multiple status indicators may be available, for the various types of protection features. For example, in one embodiment, each of the protection features may have a separate evaluation, and then a combined overall security status indicator is shown on the user's desktop. What is shown on the desktop may be a widget—such as the one shown in FIG. 7A—a taskbar icon—for example as shown in FIG. 7B—, a desktop icon, or a display in any format which is generally visible to the user during normal operation of the computer. In one embodiment, a minimal display is always visible, and further data may be provided upon right-clicking or otherwise selecting the minimal display. Thus, in one embodiment, the user need not separately activate or select the IPS system in order to see an overall security status.

Figure 1B:
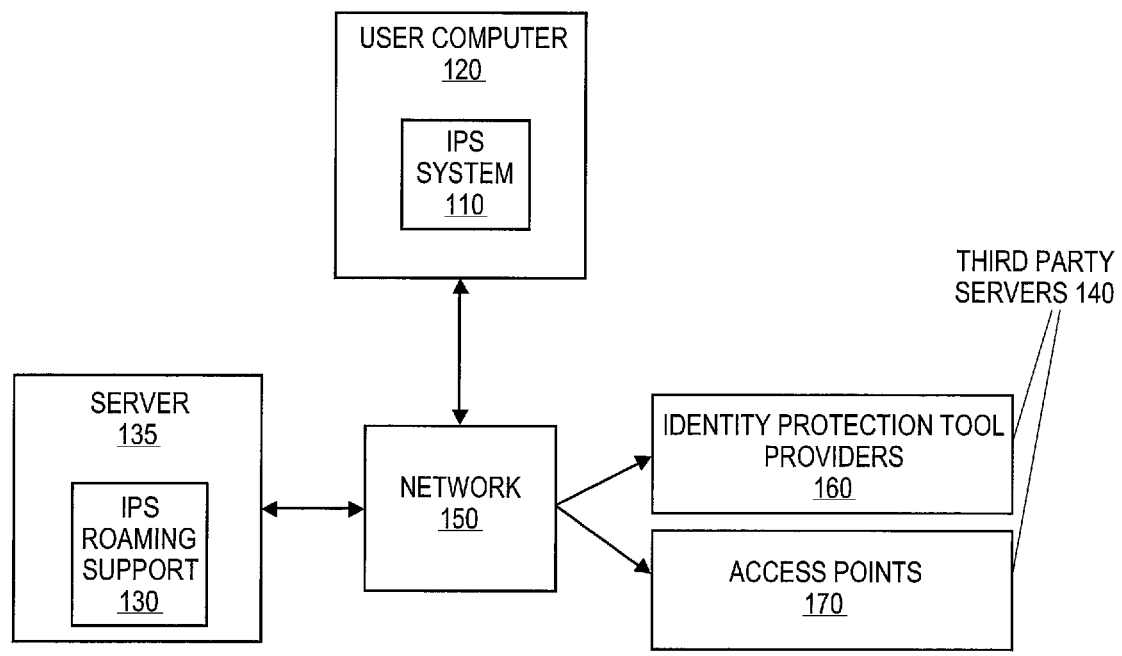
FIG. 1B is a block diagram of one embodiment of a network on which the present invention may be practiced.

FIG. 1B is a block diagram of one embodiment of a network on which the present invention may be practiced. In one embodiment, the IPS system 110 resides on a user's computer 120. The IPS roaming support 130 resides on a server 135, accessible to the user. In one embodiment, the IPS roaming support 130 is only accessible to authenticated users. In one embodiment, biometric authentication is required, to ensure that the user's digital identity is linked to their real persona. Third party servers 140 may be accessed by the user or system via network 150. The third party servers 140 may include identity protection tool providers 160 as well as access points 170. Identity protection tool providers 160 provide one or more identity protection tools, which interact with the IPS 110. In one embodiment, access points are used by the system to check a user's identity. Access points 170 may be accessed by user via the passwords stored with the IPS 110.

Figure 2:
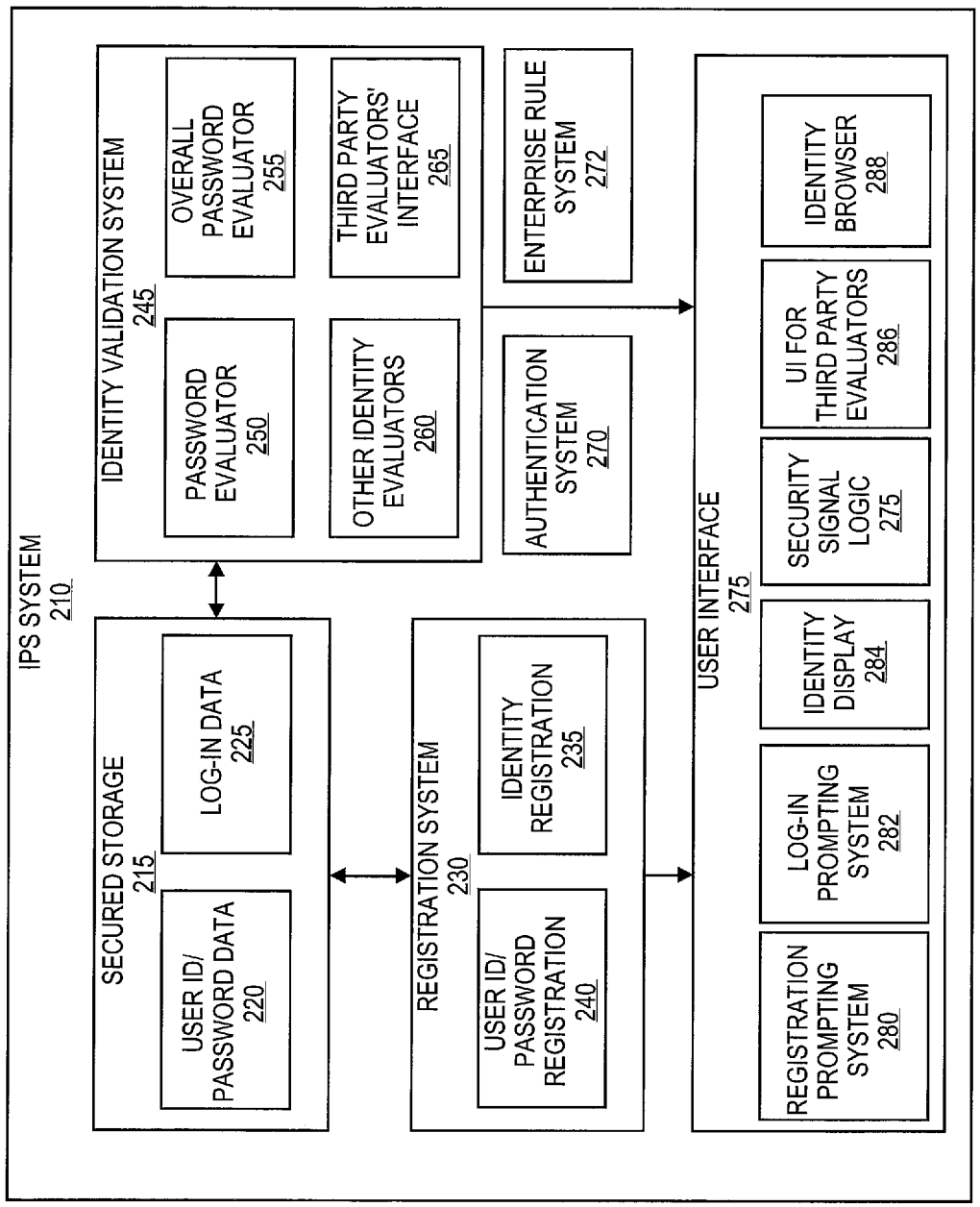
FIG. 2 is a block diagram of one embodiment of an end user identity protection suite (IPS).

FIG. 2 is a block diagram of one embodiment of an end user identity protection suite (IPS). The system includes a registration system 230 that enables a user to register his or her identity. Identity registration 235 in one embodiment is linked to the system log-in. In one embodiment, for a WINDOWS™ operating system based system, the identity registration 235 is linked to the user's log-in into the operating system. In one embodiment, the system prompts the user to create a password for the entire computer system. In one embodiment, identity registration 235 includes registered biometric identities (e.g. fingerprints, facial features, palm prints, etc.). In one embodiment, identity registration 235 may further encompass having various users with different access privileges, passwords, and security settings on a single system. For example, one of the identities registered may be that of a child and an adult. When the log-in identifies the child identity, the system may activate child filters for internet access, and restrict access to certain applications. Any identity data is securely stored 225, in encrypted form.

User ID/Password registration 240 enables a user to securely store passwords to various applications, systems, and web sites within the system. The data registered here is stored in user ID/password data 220 in secured storage. In one embodiment, the data is stored in an encrypted format.

In one embodiment, the user ID/password data is released once the authentication system 270 authenticates the user utilizing data from identity registration 235. In one embodiment, authentication is biometric authentication, to link the user's physical self to their identities. In one embodiment, the authentication system 270 has a time-out, requiring the user to re-validate after a period of time. In another embodiment, separate validation is required to release each password. In one embodiment, a password may have specific validation criteria attached to its release. For example the user may require revalidation for each release of a password to access their bank account, but may permit timing out of password release for an email account. A user may further, in one embodiment, require a different level of validation for releasing a particular type of password. For example, the user may set the validation level to password and biometric to release the log-in data for an investment account, or the like. In one embodiment, a password type may be associated with validation criteria. For example, any password associated with a financial institution may have one set of validation criteria (e.g. passphrase and biometric, revalidation required for each release) while a password associated with a social network may have different validation criteria (e.g. a password, and a long time-out period).

User interface 275 in one embodiment includes registration prompting system 280, which in one embodiment prompts the user to register a particular log-in with the system. In one embodiment, when a log-in page of an application or website is identified the user is prompted to add the log-in password/user ID to the system. In one embodiment, for each page a user is prompted three times to register. After that, in one embodiment the user is not prompted again. In one embodiment, the prompting comprises the display of a logo for the IPS system, when a log-in page is viewed. In one embodiment, the system notes when a web site requests a username and password. In another embodiment, the system has a list of standard sites which require such data (e.g. the system includes a list of web sites that it can register.)

Log-in prompting system, in one embodiment, pops up a log-in item, to enable the user to insert the log-in with a click. In one embodiment, if re-authentication is required the user will be prompted by the log-in prompting system. In another embodiment, the insertion of the log-in data is automatic. In one embodiment, the system automatically inserts the data and submits it. In another embodiment, the user is prompted to submit. In one embodiment, the user may set a preference—on a system-wide, password type, and/or per password level.

Figure 4:
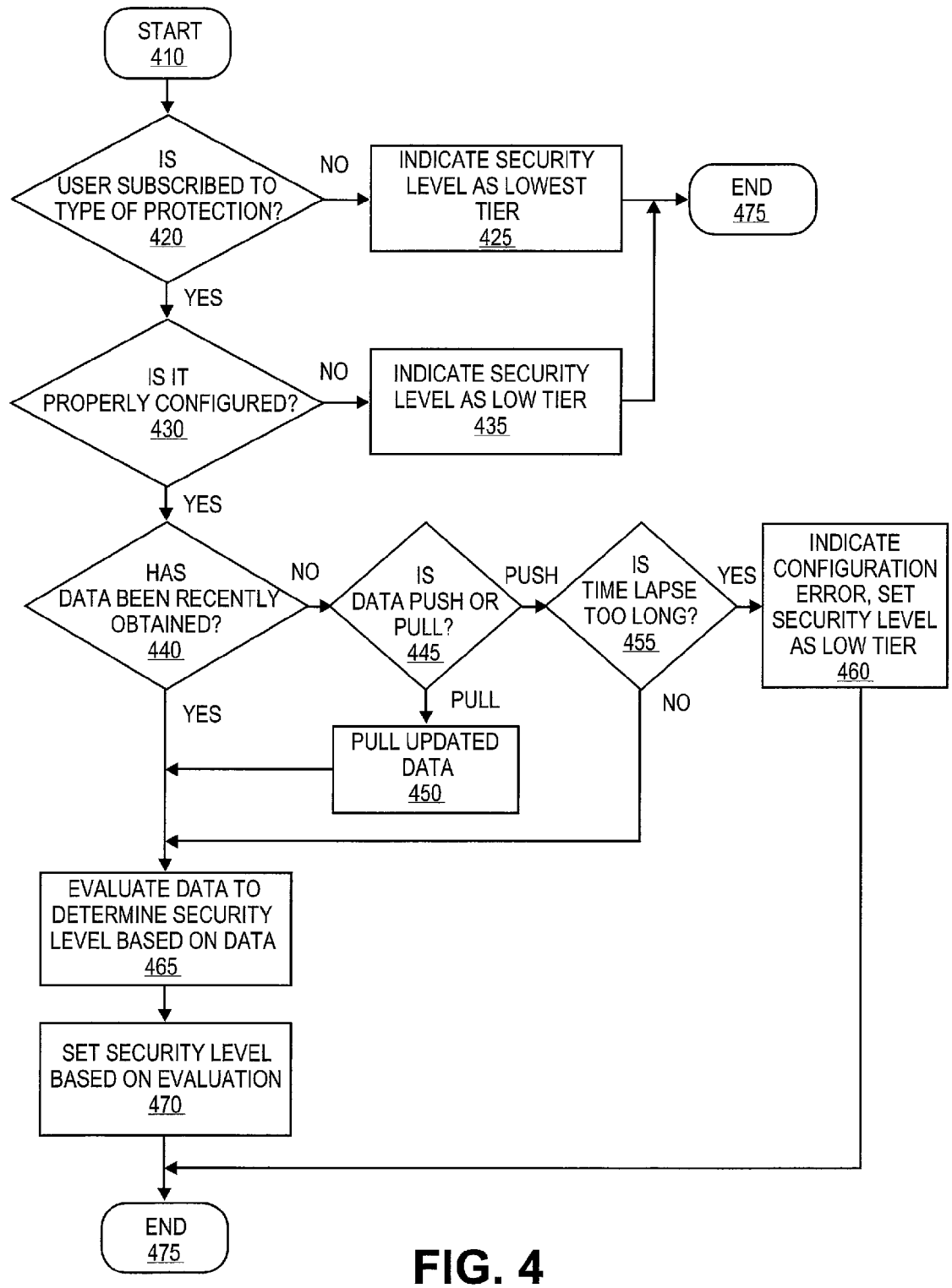
FIG. 4 is a flowchart of one embodiment of the system evaluating a particular identity's security level.

Identity validation system 245 verifies the security of the user identity, in various ways. Individual password evaluator 250 evaluates the security of individual passwords. In one embodiment, the method shown in FIG. 4 is used. Each password is evaluated for length, character set, and maturity. For example, a password that is short, or only utilizes the standard U.S. alphabetic characters, or is older than a preset age would be deemed to be "not very safe." In one embodiment this may be indicated by a red light. In one embodiment, the user or an administrator may adjust the settings, e.g. what would be considered not very safe v. safe.

Of course, the light suggestions are merely suggestions. Alternative settings, more or fewer gradations, may be used within the scope of this invention.

Furthermore, in one embodiment, there is an overall password evaluator, which evaluates all passwords in conjunction with each other. This password evaluator, in one embodiment, determines commonality between passwords. Users often utilize the same password for multiple accounts, which is an unsafe practice. Therefore, overall password evaluator 255 evaluates the passwords with respect to each other.

In one embodiment, identity validation system 245 further includes other identity evaluators 260. In one embodiment, other security evaluators may include a file encryption utility. In one embodiment, the file encryption utility allows users to encrypt one file, entire folders, and/or the entire hard drive. In one embodiment, the identity validation system 245 receives data from the file encryption utility, indicating a level of security. In one embodiment, the evaluation for a tool may be a three-fold evaluation. The system may determine whether the application is active, properly installed, and being used. An active application is one that is live, e.g. running. A properly installed application is set up properly to provide the security/protection function it is designed to provide. And an application is used if the computer and/or user is utilizing the application. In one embodiment, these three steps correspond to the three levels of security indication. In one embodiment, the system may further determine whether the tool is being used by default. A tool is used by default if it does not require user interaction to provide its protection.

In one embodiment, the other security evaluators include a messaging encryption tool. The messaging encryption tool may encrypt and/or sign e-mail messages, instant messenger (IM) communications, and other messaging communications. In one embodiment, the messaging encryption too may utilize one or more of the following to evaluate security: percentage of messages encrypted, percentage of messages signed, percentage of encrypted or signed communications to which the response was also encrypted or signed. As above, in one embodiment, the messaging encryption tool provides the raw data, and the security evaluator 260 for the messaging encryption tool utilizes the data to determine an overall security level for the messaging encryption tool.

In one embodiment, the other security evaluators include a configuration tool to enable the configuration of a child log-in. In one embodiment, when a separate log-in is set up for a child or other restricted user, the configuration tool enables the user to restrict access to various features/web sites/applications/files or directories user accounts. In one embodiment, the security evaluator 260 determines whether a child log-in has been set up, and if so whether it has been fully configured. Note that while the term "child log-in" is used, the log-in describes any secondary user whose access to the system is restricted, regardless of the user's age or ability.

In one embodiment, the other security evaluators include a malicious program detector, which is a tool to detect threats to the computer system such as a virus, worm, or Trojan. In one embodiment, the security level is determined by one or more of: the last date malicious software signatures were updated, last date the full test/clean-up was run on the system, and the availability and functioning of memory-resident continuously run verification tools.

In one embodiment, in addition to other security evaluators, the identity validation system 245 may include third party evaluator interface 265. The third party evaluator interface 265 allows third party tools to be run remotely or locally, and to have their results integrated into the identity validation's display. In one embodiment, the third party evaluator interface 265 enables a user to control a third party tool, using third party UI 286. In one embodiment, third party UI 286 provides a user interface directly from the IPS to alter settings, interact with, and otherwise control third party tools. This provides a unified user interface to control security tools.

In one embodiment, third party tools may include tools such as a credit checking tool, a credit freeze tool, a web identity tool, etc. The credit checking tool, in one embodiment, checks the user's credit rating. The credit freeze tool, in one embodiment, checks if any new credit inquiries have been made to open new credit cards or other credit lines in the user's name and potentially requires user's confirmation before "unfreezing" the credit line and enabling new credit to be issued. The web identity tool evaluates the user's web presence to see if there are any offensive or problematic items, if accounts have been accessed by malicious users, or information available online has been modified without user's intervention. Some of these tools scan a network, such as the Internet. In one embodiment, the tools may be run from a server, rather than the user's system, and the tool may simply report results to the IPS system. In one embodiment, the results of these searches can be received by the third party evaluator interface 265. The results of these searches/tools are then utilized to calculate a security value for each of the tools available.

Each individual tool provides an individual evaluation, for a password, a security evaluator, or a third party tool. Note that the list of tools provided here are merely exemplary. Any tool useful to secure the user's identity may be integrated into the system. Full integration into the system enables the user to access the tool, and control its settings from the IPS. Partial integration may be available for some tools, which allow the results of the tool's evaluation to be displayed within the IPS system.

The identity validation system 245 calculates, in one embodiment, an overall security rating for the user. In one embodiment, a user or administrator may configure the identity validation system 245 for various purposes. For example, the setting may be to automatically downgrade the overall security rating if there is a particular application or tool which is rated "very weak." Alternatively, the setting may be to downgrade the security rating only if a particular percentage of applications or tools are weak. In one embodiment, the system comes pre-configured with default settings. However, the user or administrator, in one embodiment, may tweak those settings to their own preference. In one embodiment, when a user or administrator adds another security evaluator and/or third party evaluation tool, the user or administrator is given the chance to control the settings of that tool. In one embodiment, the system may exclude the tool from the overall security rating. In one embodiment, the system may weigh heavily the rating of that tool.

User interface 275 includes security signal logic 275. Security signal logic 275 generates a security signal based on the identity validation system 245 output. In one embodiment, the security signal logic 275 generates a single color code indicating the user's overall security state. In one embodiment, the colors are green (good), yellow (risky), and red (problem). In another embodiment, more or fewer gradations may be used. In one embodiment, the security signal may be a numerical value between 1 and 10, ranging from insecure (1) to highly secure (10). In another embodiment, a gauge may be used showing a gradation between weak and strong. Alternative display methods may be used. In one embodiment, the display method is to communicate the system state at a glance.

In one embodiment, instead of a single security signal, there may be multiple security signals which are shown. For example, there may be a "financial security" signal for aspects related to the financial security of the user, and a "personal security" signal for aspects related to the user's person. As another example, different security signals may refer to "data security", "financial security", and "personal security." Alternative divisions of the security signals may be used. In one embodiment, there may be overlap between these signals. For example, the financial security signal may include the password strength of passwords for the user's banking and other financial accounts, which may also be included under the computer security rubric.

Figure 7A:
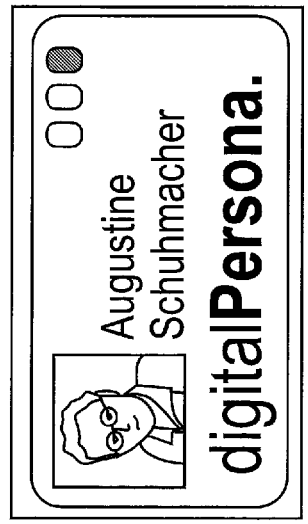
FIG. 7A is a screenshot of one embodiment of a sidebar gadget.

Identity display 284 generates a visible indicator of the security signal. In one embodiment, the identity display 284 is an always-visible display which generates a user interface feature that is visible even when the IPS system is not the active application. For example, the identity display may be a desktop widget, if the user's system is running the WINDOWS™ VISTA™ or WINDOWS 7™ operating system. FIG. 7A shows such an exemplary desktop widget. In one embodiment, a color of the widget indicates that the user's security state is good. FIG. 7B shows a toolbar item showing a symbol. The symbol may differ with the various security states, may have different colors depending on security state, may include a word or image indicating security state, or may otherwise make obvious at a single glance what the user's security state is. As noted above, there may be multiple security states for various aspects of the user's security. FIG. 7C illustrates an exemplary widget indicating multiple identities having associated security indicators. The display may also be a gauge, a graphic bar, or any other display which visually indicates the user's overall security state.

User interface 275 may further include identity browser 288. Identity browser 288 is the dashboard which provides access to the identity protection tools available via the IPS. The identity browser 288, in one embodiment, can be used to get a snapshot of the user's digital identities. In one embodiment, the system would group the various tools by the various types of identities. For instance, identities may include online identities, healthcare identities, financial identities, credit identities, social networking identities, and/or others. In one embodiment, the identity browser 288 may be used by a user to interact with their identities—such as accessing, protecting, and/or managing their medical data, see their credit card bill, etc. Consolidating such identity specific access into a biometric-protected browser is powerful and beneficial to the consumer. In one embodiment, the IPS works with data providers (such as banks, health data providers, social networking sites, etc) to consolidate a view of the users' personal data from those sources.

In one embodiment, enterprise rule system 272 enables a corporate entity, or an administrator to set evaluation rules and settings on an enterprise level, e.g. across multiple users' systems. In one embodiment, enterprise rule system 272 may control not only the identity validation system 245, but also the identity registration 235 requirements. In one embodiment, enterprise rule system 272 may further set the authentication requirements (e.g. password and biometric v. password only). In one embodiment, enterprise rule system 272 may also pre-register sites for which the user must use the IPS system. For example, the enterprise rules may require that for utilizing a VPN (virtual private network) tool, the user must log in through the IPS system, and must re-authenticate with a biometric and a one-time password. In one embodiment, the enterprise rule system 272 may also check password strength across multiple user's systems.

In this way, the IPS system provides an integrated identity and security management tool, which enables the user to easily see their overall status, as well as the status of individual aspects of the system. IPS also provides a unified system which enables the user to interact with various security tools.

Figure 3:
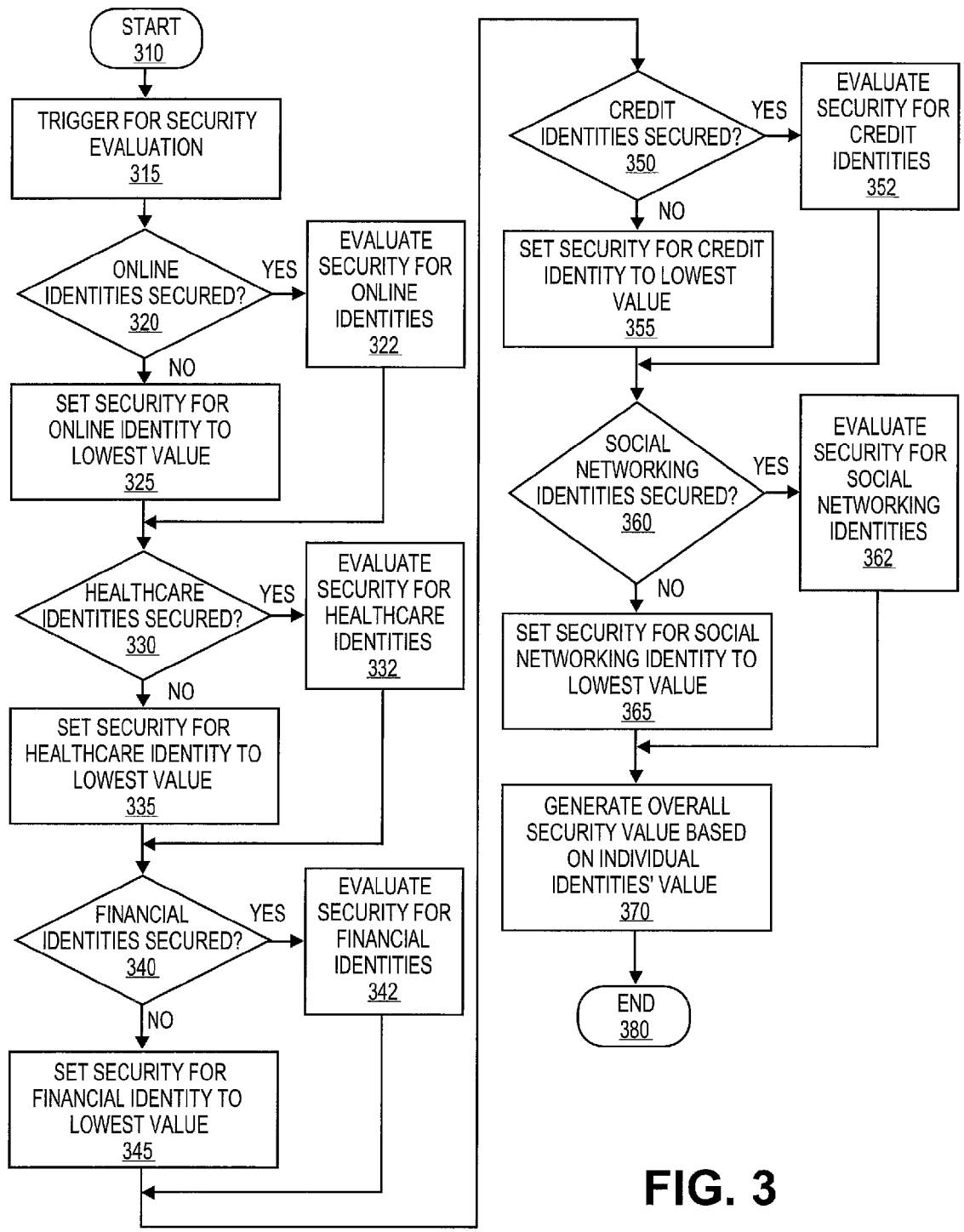
FIG. 3 is a flowchart of one embodiment of using the system to evaluate systemic security levels.

FIG. 3 is a flowchart of one embodiment of using the system to evaluate systemic security levels. The process starts at 315 when a security evaluation is triggered. In one embodiment, a security evaluation may be automatically triggered when a change is detected, periodically triggered, manually triggered, triggered by an administrator, or otherwise started.

In one embodiment at block 320, the process determines whether online identities are secured. In one embodiment, the user may have one or more online identity protection tools. These tools may include identities on gaming sites, email identities, etc. If there is at least one online identity validation tool, the process continues to block 322. At block 322, the process utilizes the online identity validation tool(s) to calculate a security status for online identities. If there are no online identity security tools, the process at block 325 sets the online identity security value to the lowest value in one embodiment. In another embodiment, the default setting is a "medium value" setting and the lowest value is set only when an actual problem is detected. The process then continues to block 330.

The process at block 330 does a similar validation for healthcare identities. At block 340, financial identities, at block 350 credit identities, at block 360 social networking identities. Note that these are merely exemplary classes of identities. The actual implementation may include a subset of these identities, or a superset. In one embodiment, only a single identity validation tool is needed for this process.

At block 370, an overall security value is generated for all identities, based on the relative scores of each of the identities. In one embodiment, the various identities may also have a relative weighting. For example, a user may indicate that his or her credit identity is more valuable than the social networking identity. Therefore, the results of the credit identity may be more heavily weighted in calculating an overall score. The process then ends. This overall security value may be displayed to the user. In one embodiment, it may also be used to suggest certain changes to the user, e.g. to make changes to improve the results.

FIG. 4 is a flowchart of one embodiment of the system evaluating a particular identity's security level. In one embodiment, this corresponds to one of the tool evaluations referenced in FIG. 3 above.

At block 420, the process determines whether the user is subscribed to any type of protection. If not, at block 425, in one embodiment a lowest security level is indicated for the particular tool. In one embodiment, a suggestion is made to the user to subscribe to one or more tools. The process then ends at block 475.

If the user is subscribed to a tool, the process continues to block 430. At bock 430, the process determines whether the tool is properly configured. In one embodiment, the tool is properly configured if it has access to the data it needs, and is set to perform an evaluation.

If it is not properly configured, at block 435, a low security level is set. In one embodiment, the security level is a second lowest security level. In another embodiment, the security level is the lowest security level. The process then ends at block 475.

If the tool is properly configured, the process continues to block 440. At block 440, the process determines whether the data for the tool to perform its evaluation has been recently received. If it has, at block 465, the data is evaluated to determine a security level based on the data. In one embodiment, the data may indicate a problem, or no problem. If a problem is indicated, in one embodiment, the security level for the tool is reduced. In one embodiment, for certain security evaluation results, a separate alert or other indicator is also triggered. For example, if the tool is a credit evaluation tool, if the data indicates that there is a fraud alert that needs to be handled, the user may be alerted. For example, an email may be sent, a special alert signal may be added to the toolbar, widget, or other display mechanism, an audio alert may be provided, or another indicator may be used.

At block 470, the security level is set based on the results of the evaluation. In one embodiment, this security level is assigned to the identity validation tool. It is also used in the calculation of the combined security evaluation for this particular identity group and for the overall security state indicator as well. The process then ends.

If, at block 440, the process determines that the data has not been recently obtained, the process continues to block 445. At block 445, the process determines whether the data is push or pull. Pushed data is automatically sent by a service. Pull data is requested by the system. If the data is pull data, the process, at block 450 pulls updated data. The process then continues to block 465, to perform a security evaluation based on the new data.

If the data is push data, the process at block 455 determines whether the time lapse is too long. If the time is not too long, the older data is used, at block 465 to evaluate the security level. If the time lapse is too long, in one embodiment at block

460, the system sets the tool to indicate that there is a configuration error—which is causing the lack of data, and the security level is set to a low level. The process then ends at block 475.

Figure 5A:
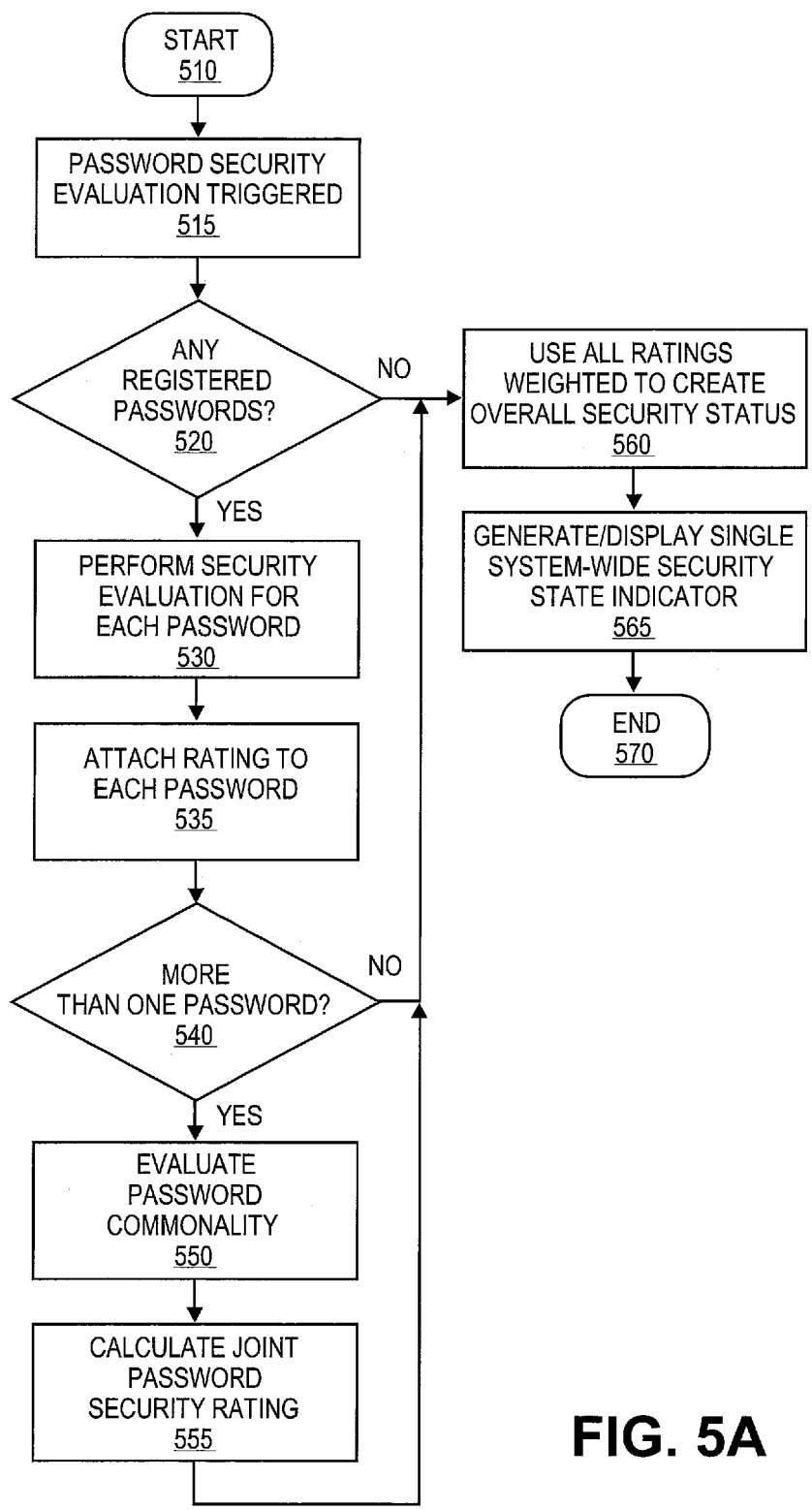
FIGS. 5A and 5B are flowcharts of evaluating password strength.

FIG. 5A is a flowchart of one embodiment of the system evaluating password security level. The process starts at block 510. At block 515, a trigger for a security evaluation is detected. In one embodiment, a change in any tool or setting may trigger a security evaluation. In one embodiment, the addition of one or more new items to the security tools or password list may trigger a security evaluation. In one embodiment, if a certain period of time has expired, a security evaluation may be triggered.

At block 520, the process determines whether there are any passwords registered with the system. If there are no passwords registered with the system, the process continues to block 560.

If at block 520 the system determines that there are registered passwords, the process continues to block 530.

Figure 5B:
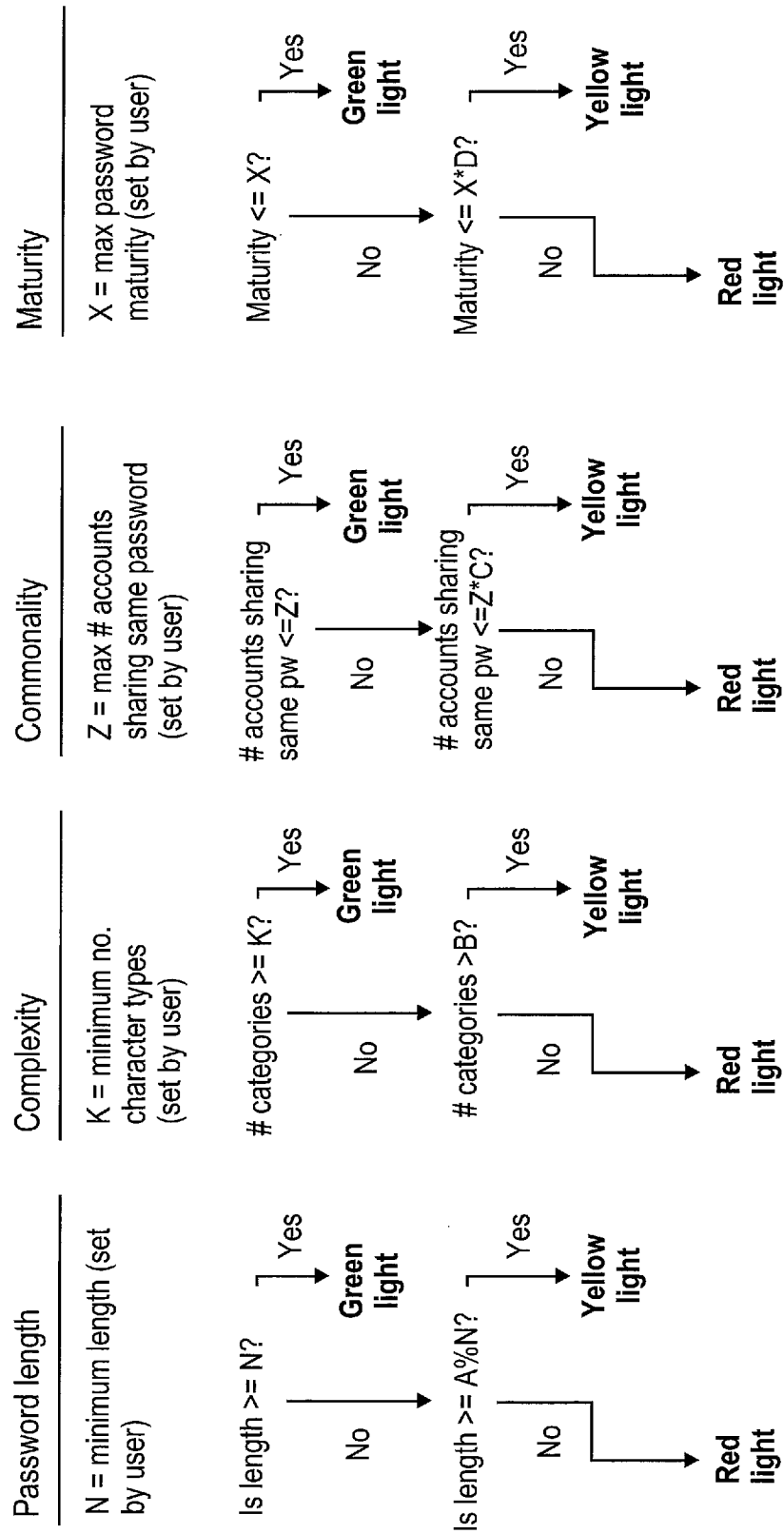

At block 530, the system performs a security evaluation for each password. In one embodiment, the security evaluation shown in FIG. 5B is performed. At block 535, a rating is attached to each password. In one embodiment, the rating is one of three ratings (red, yellow green). In another embodiment, another set of levels may be attached.

At block 540 the process determines whether there is more than one registered password. If so, at block 550, password commonality is evaluated. At block 555, a joint password security rating is calculated. The joint password security rating is calculated based on the ratings of each individual password, and the password commonality rating. The process then continues to block 560.

At block 560, all ratings including password and applications are used to create an overall security state. In one embodiment, the ratings are weighted by the relative importance of each security tool. In one embodiment, the system includes a default weighting. In one embodiment, the default weighting may give additional weight to financial-related tools. In one embodiment, a user or administrator may adjust the relative weights of one or more of the tools utilized.

At block 565, in one embodiment a system-wide security state indicator is generated. As noted above, this may be a widget (FIG. 7A), toolbar icon (FIG. 7B), or any other visual identifier. In one embodiment, the visual identifier is in a display that is visible even when the IPS is not the currently active application. However, in one embodiment, the IPS system runs in the background whenever the security state indicator is showing. Note that while the examples of FIGS. 7A and 7B are color coded, alternative coding or display mechanisms may be used. For example, the display may be a number, a gauge, a thermometer, or any other type of display that can show at least two levels (e.g. a good and a bad). However, in one embodiment, there may be many more gradations, e.g. 10, 20, or more. The process then ends at block 570.

Figure 6:
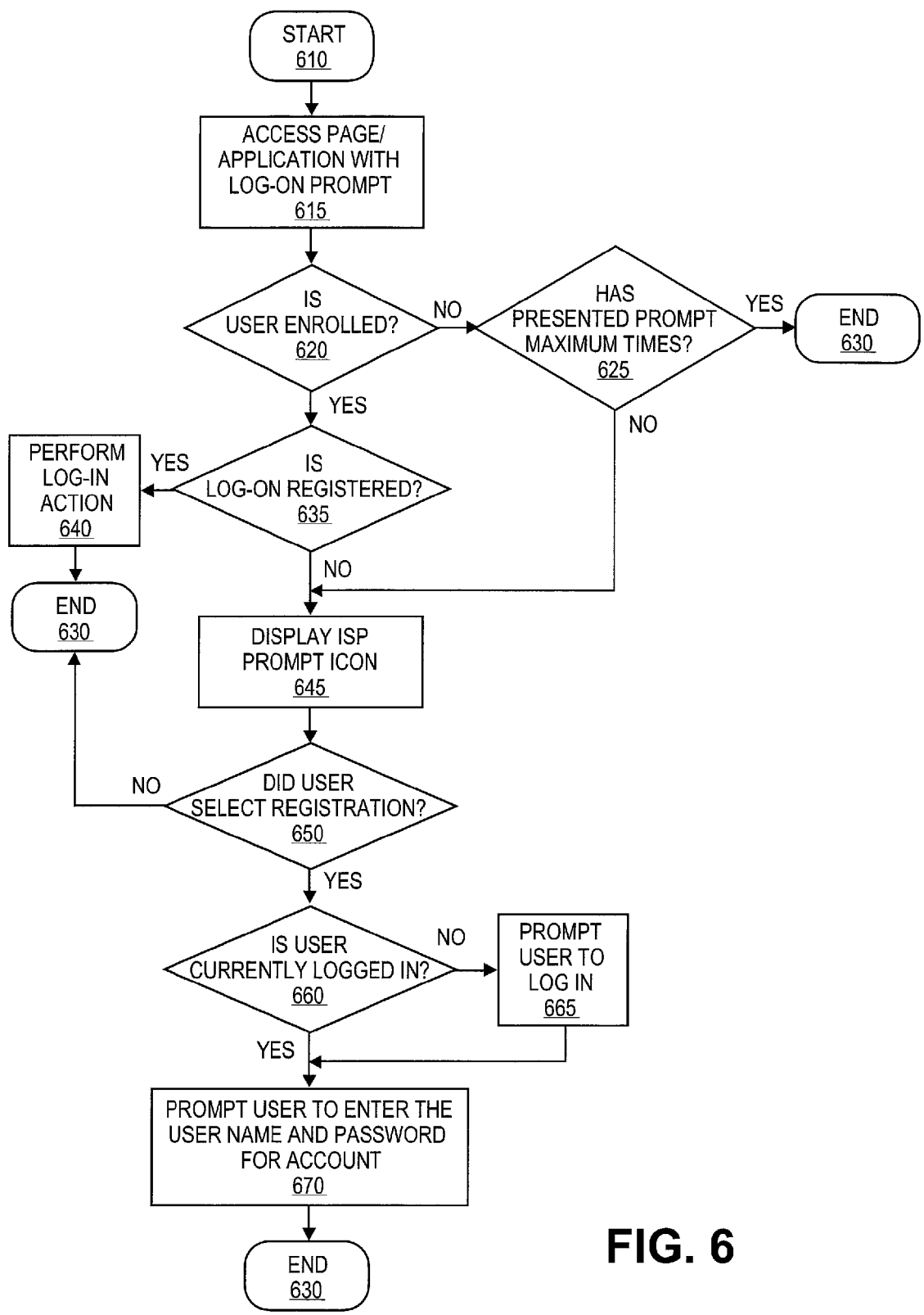
FIG. 6 is a flowchart of one embodiment of registration for utilizing the password system.

FIG. 6 is a flowchart of one embodiment of using the password system. The process starts at block 610. At block 615, an application or page that includes a log-in prompt is accessed by the user. In one embodiment, the log-on prompt is recognized by the system. In another embodiment, the address/application is recognized by the system.

At block 620, the process determines whether the user is enrolled. The user is enrolled if he or she has one or more authentications enrolled with the system. The authentication may include a user ID and password, biometric, or other means of accessing a document, program, site, etc.

If the user is not enrolled, the process at block 625 determines whether the log-in prompt has been presented a preset number of times. In one embodiment, in order to ensure that the user who does not wish to utilize the IPS system isn't bothered, the suggestion to use IPS is only presented a limited number of times. If the prompt has been presented the maximum number of times, the process ends at block 630. Otherwise, the process continues to block 645. In one embodiment, the maximum number is re-initialized when a user opens or otherwise interacts with the IPS system.

If the user is enrolled with the IPS system, as determined at block 620, the process continues to block 635. At block 635, the process determines whether the particular access page or application is registered, e.g. whether an associated password/user ID has been registered. If so, the process continues to block 640. At block 640, the log-in action is performed.

In one embodiment, the log-in action is displaying a one-click log-in feature. In one embodiment, the log-in action is automatically inserting the user ID/password data into the system. In one embodiment, the log-in action is inserting the user ID/password and submitting it. In one embodiment, the one-click log-in feature enables the user to perform a default action with a single click. In general, the default action may be to insert the log-in data and submit it. In one embodiment, no user interaction is needed in order to complete log-in, if no re-authentication is necessary. In one embodiment, from the one-click log-in feature, the user may easily get to a "change log-in" menu, or select another action within the IPS system. After the log-in action is performed, at block 640, the process ends at block 630.

If the log-on was found not to be registered, at block 635, the process continues to block 645. This is also the block reached if the user is not enrolled yet in the IPS system.

At block 645, the IPS prompt icon is displayed. The IPS prompt icon informs the user that the identity protection system of IPS is available on this system, and that the user may add the current log-in to the IPS system.

At block 650, the process determines whether the user elected to register, and adds this log-on to the IPS system. If not, the process terminates at block 630, allowing the user to complete the access utilizing the traditional methods.

If the user selects registration, the process continues to block 660. At block 660, the process determines whether the user is currently logged into the IPS system. In one embodiment, the IPS system log-in expires periodically. In one embodiment, the user must log into the IPS system each time to enter a new registration.

If the user is not logged in, at block 665, the user is prompted to log into the IPS system. The log-in may be various types, such as a password, a biometric, a one-time password, a smart card, another currently known or later developed authentication means, or combination of log-ins. The process then continues to block 670.

At block 670, the user is prompted to enter the username and password for the account/site/application being accessed. The process then stores this data. In one embodiment, the user is given the opportunity to set preferences for this particular user ID/password. For example, the user may prefer to have an extra authentication to log into financial accounts. In that case, the user may specify that log-in via biometric is required to release this password/UID pair. The process then ends.

Figure 8A:
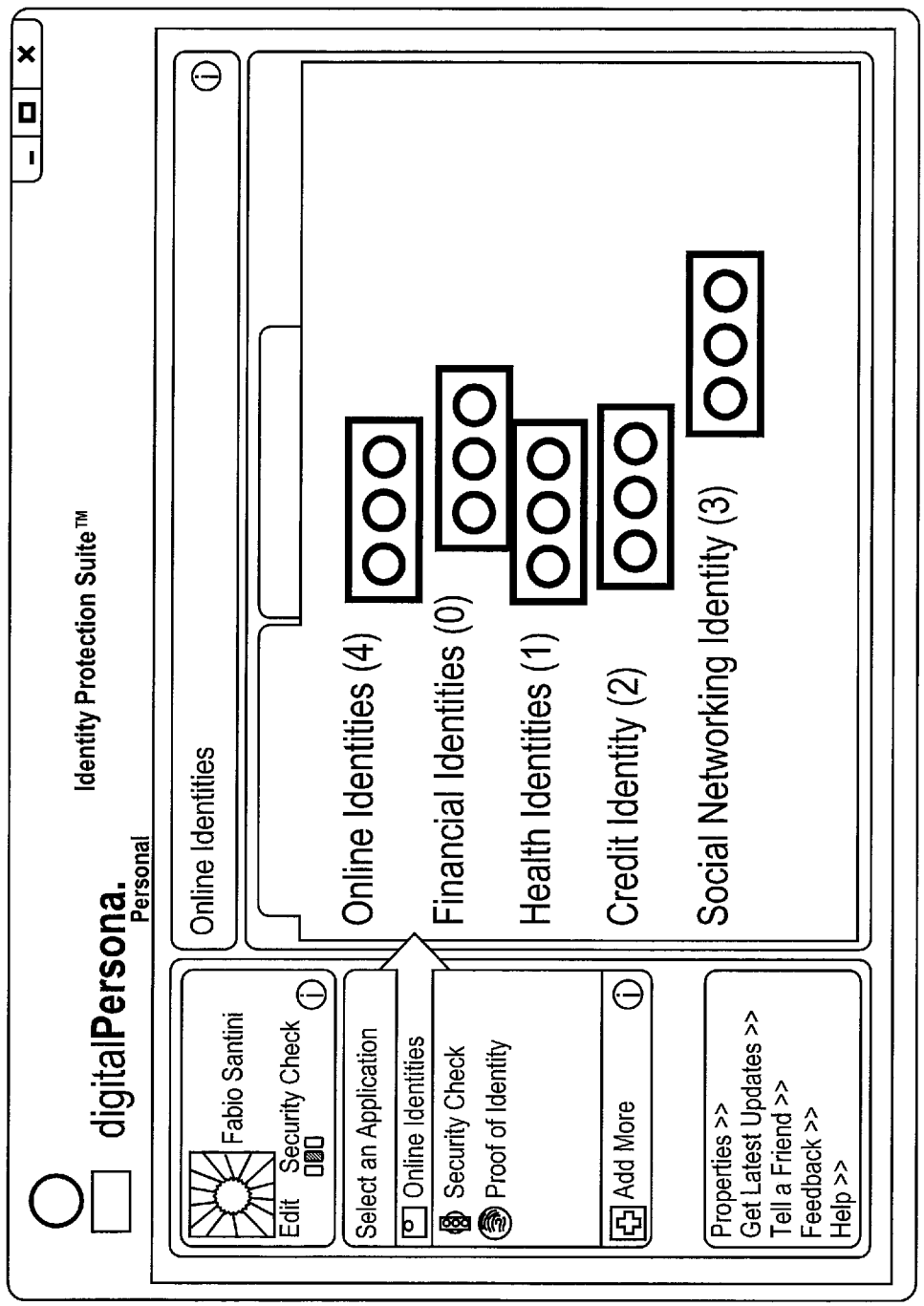
FIGS. 8A-E are screenshots of one embodiment of the interface to the IPS.

FIGS. 8A-E are screenshots of one embodiment of the interface to the IPS. FIG. 8A shows an exemplary screenshot of the IPS interface. The system shows a plurality of exemplary identities. In one embodiment, each of the identities is associated with a particular type of tool. The tools are assigned to various identities automatically. In one embodiment, the user may assign a tool to a particular identity. In one embodiment, each of the identities has an associated security rating.

Figure 8B:
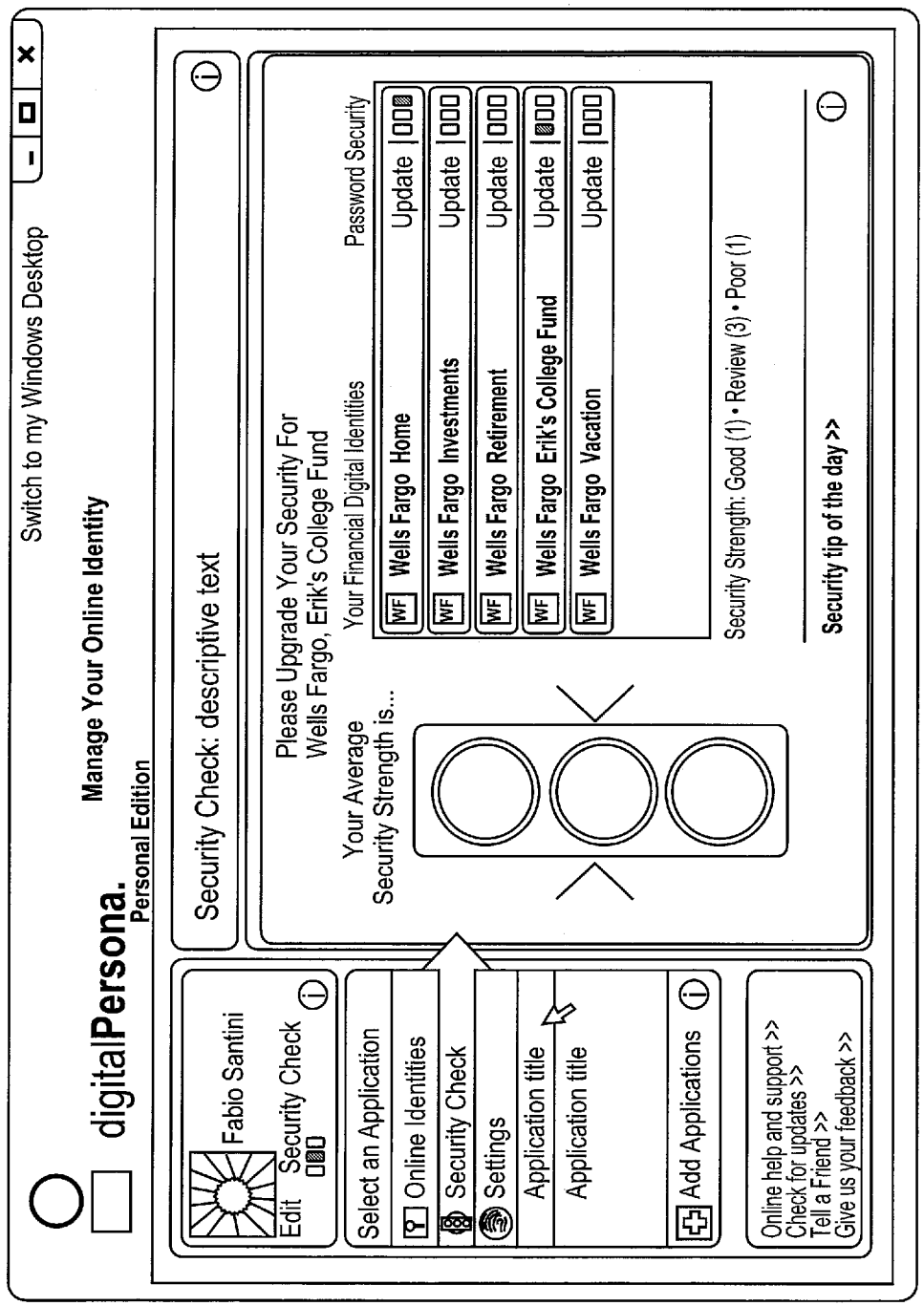

FIG. 8B shows an exemplary security check screen. As can be seen, an "average security strength" for all passwords is shown on this screen. As can be seen, there is also a security strength for each of the passwords shown. Alternatively sets of passwords may be grouped by category (e.g. financial, medical, social networking, etc.) and a category-level security strength indicator is shown.

Figure 8C:
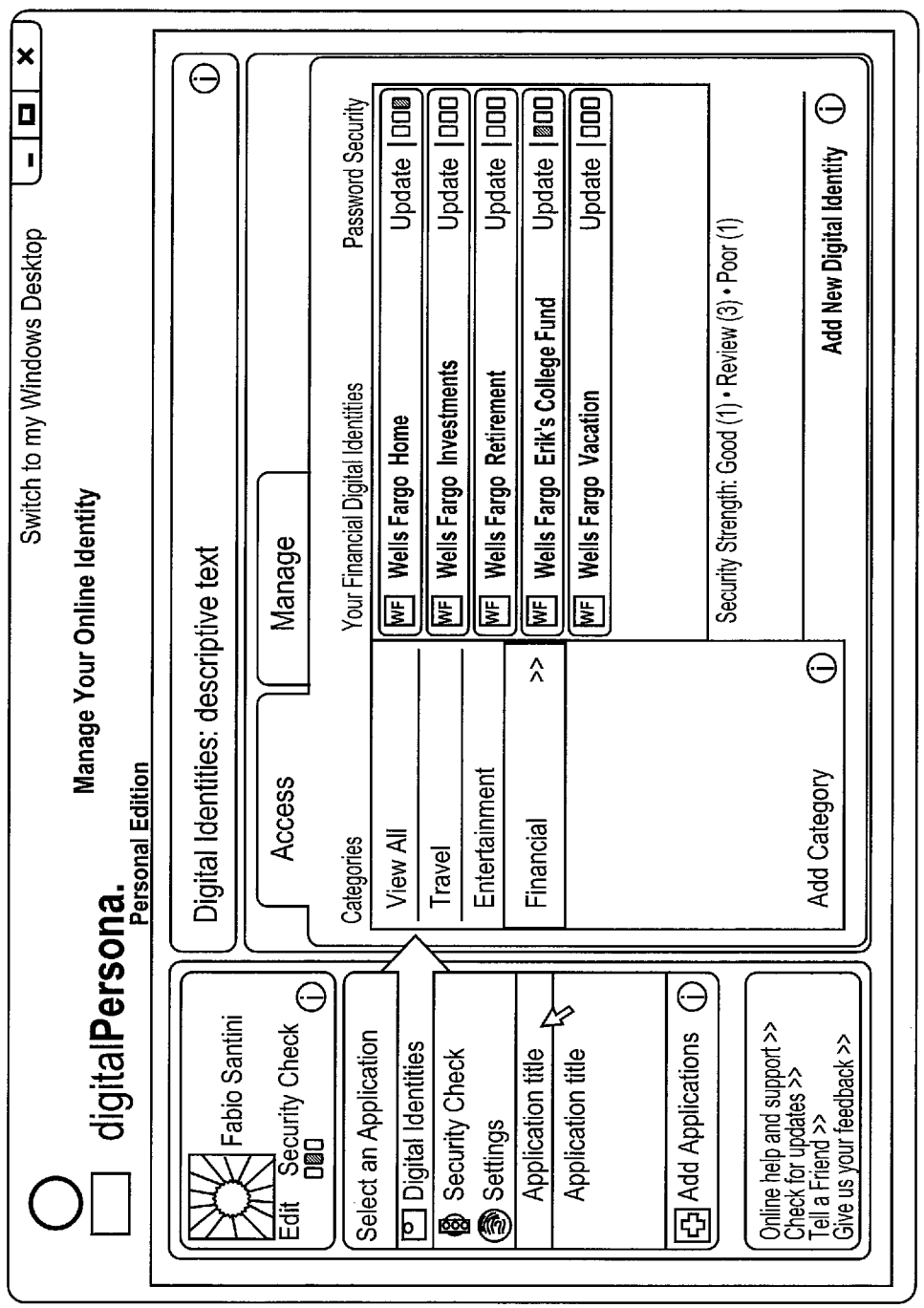

FIG. 8C shows one embodiment of digital identities. In one embodiment, the digital identities are sorted by category. In one embodiment, the system automatically categorizes passwords.

Figure 8D:
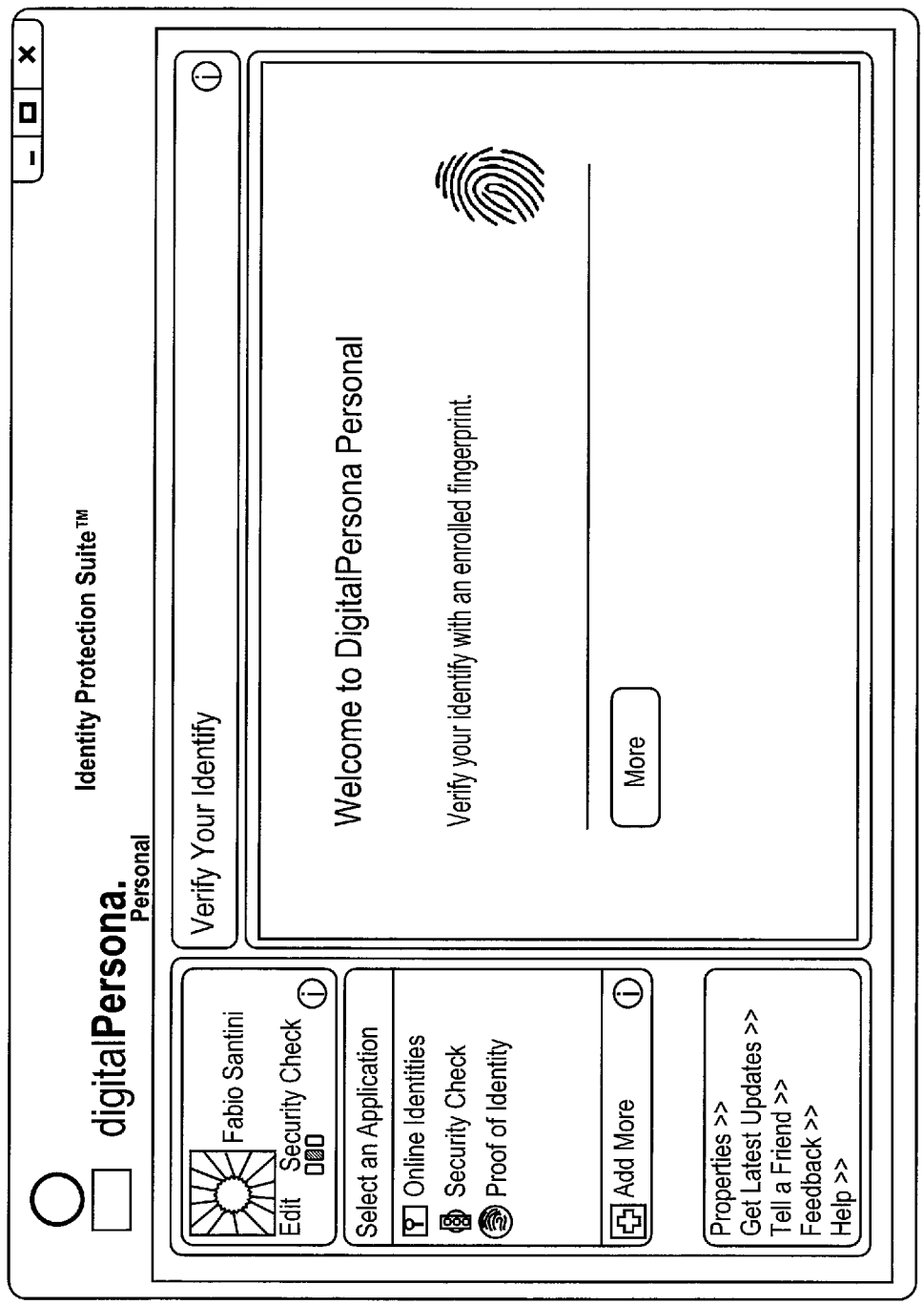

FIG. 8D shows one embodiment of logging into the IPS system using a biometric, in this case a fingerprint. Note that while the example shown is utilizing a single authentication method that is a biometric, this is merely exemplary. The log-in may be a password, another type of biometric, a smart card or other authentication mechanism or combination of mechanisms.

Figure 8E:
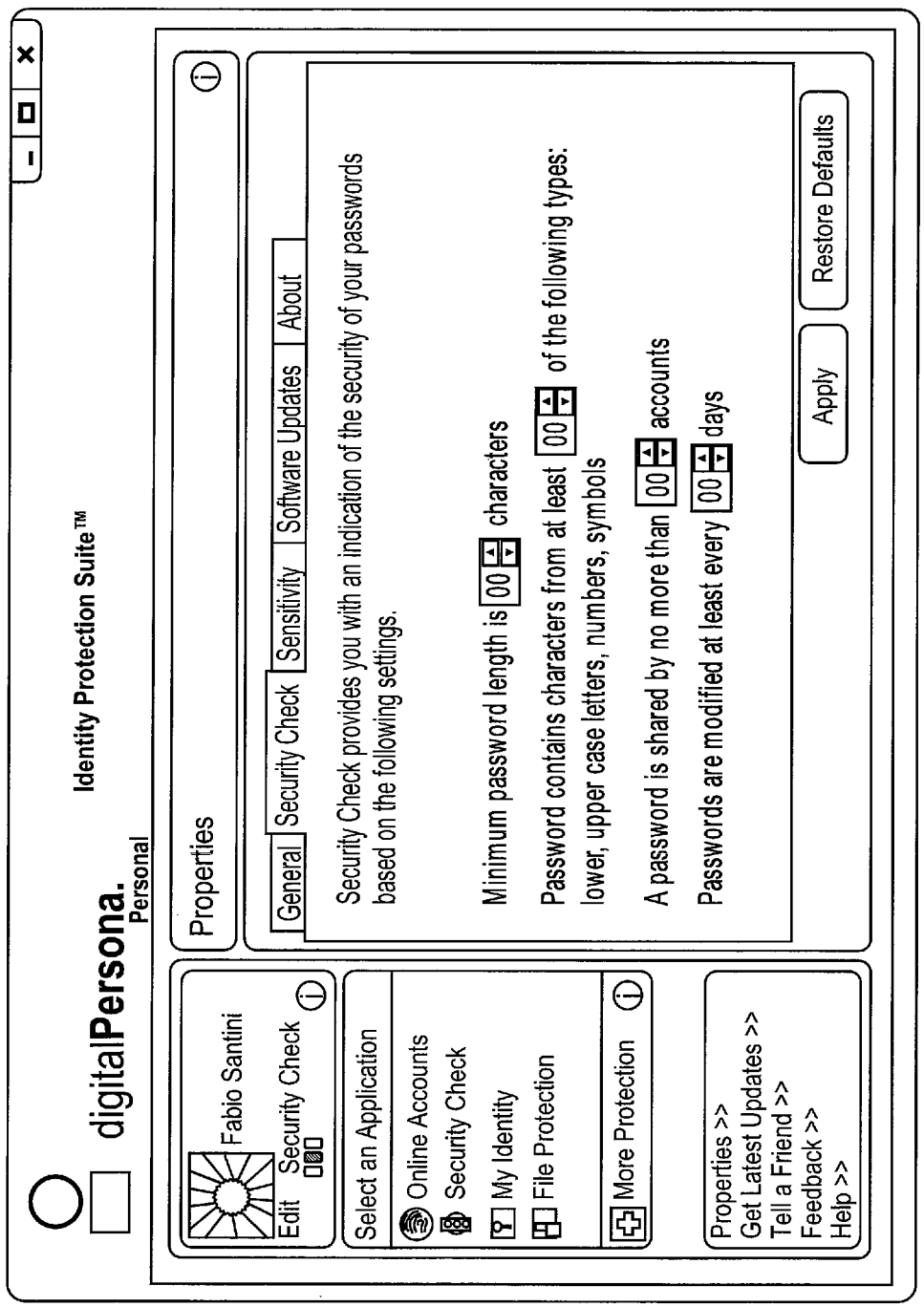

FIG. 8E shows one embodiment of an interface enabling a user to tweak the thresholds used for classifying security levels for passwords. In one embodiment, similar interfaces are available for evaluating individual security tools, as well as the calculation of the overall status per category or for the entire system.

Figure 9:
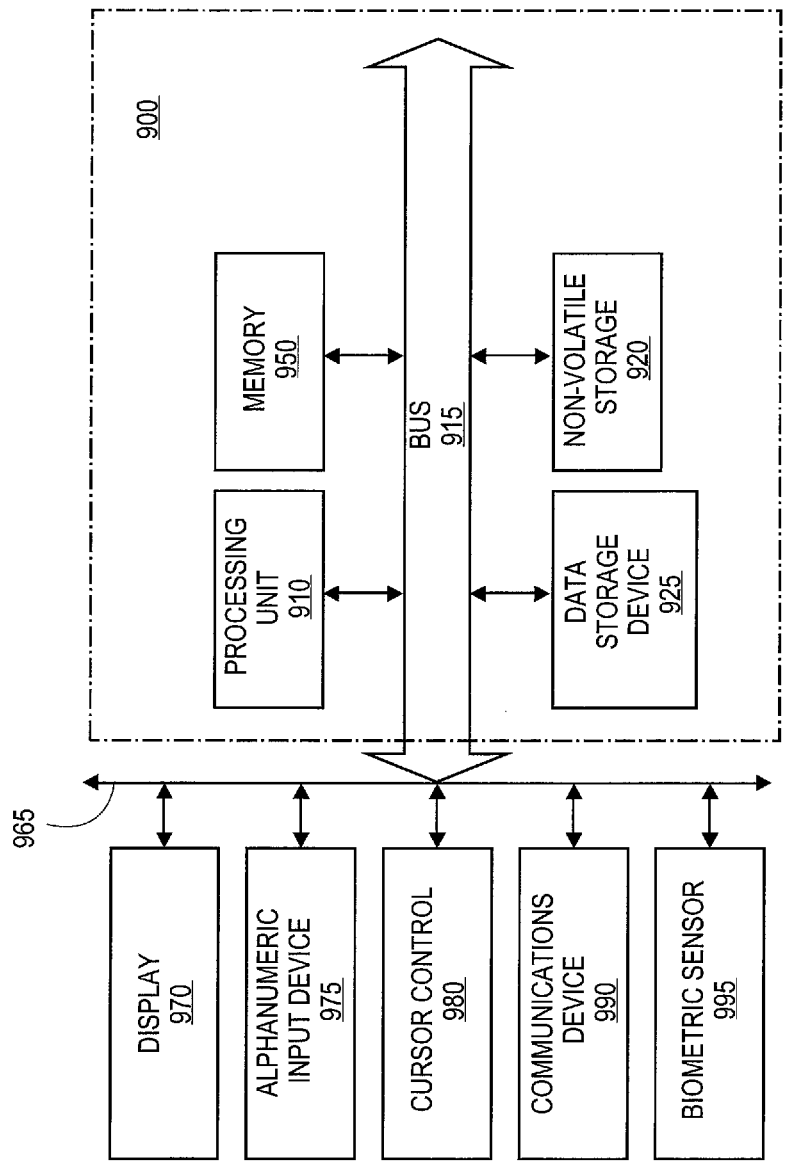
FIG. 9 is a block diagram of one embodiment of a computer system which may be used with the present invention.

FIG. 9 is one embodiment of a computer system that may be used with the present invention. It will be apparent to those of ordinary skill in the art, however that other alternative systems of various system architectures may also be used.

The data processing system illustrated in FIG. 9 includes a bus or other internal communication means 915 for communicating information, and a processing unit 910 coupled to the bus 915 for processing information. The system further comprises a random access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor 910. The system also comprises a read only memory (ROM) and/or non-volatile storage device 920 coupled to bus 915 for storing static information and instructions for processor 910, and a data storage device 925 such as a magnetic disk or optical disk and its corresponding disk drive. Data storage device 925 is coupled to bus 915 for storing information and instructions.

The system may further be coupled to a display device 970, such as a cathode ray tube (CRT) or a liquid crystal display (LCD) coupled to bus 915 through bus 965 for displaying information to a computer user. An alphanumeric input device 975, including alphanumeric and other keys, may also be coupled to bus 915 through bus 965 for communicating information and command selections to processor 910. An additional user input device is cursor control device 980, such as a mouse, a trackball, stylus, or cursor direction keys coupled to bus 915 through bus 965 for communicating direction information and command selections to processing unit 910, and for controlling cursor movement on display device 970.

Another device, which may optionally be coupled to computer system 900, is a communications device 990 for accessing other nodes of a distributed system via a network. The communications device 990 may include any of a number of commercially available networking peripheral devices such as those used for coupling to an Ethernet, token ring, Internet, or wide area network. The communications device 990 may further be a null-modem connection, or any other mechanism that provides connectivity between the computer system 900 and the outside world.

Another device which may optionally be coupled to computer system 900 is biometric sensor 985. Biometric sensor 985 may be a fingerprint reader, iris scanner, camera for face recognition or iris detection, microphone for voice analysis, or any other tool to obtain a biometric. In one embodiment, the system may include a port to accept a smart card or similar authentication device. Note that any or all of the components of this system illustrated in FIG. 9 and associated hardware may be used in various embodiments of the present invention.

It will be appreciated by those of ordinary skill in the art that any configuration of the system may be used for various purposes according to the particular implementation. The control logic or software implementing the present invention can be stored in main memory 950, data storage device 925, or other storage medium locally or remotely accessible to processor 910.

It will be apparent to those of ordinary skill in the art that the system, method, and process described herein can be implemented as software stored in main memory 950 or non-volatile memory 920 and executed by processor 910. This control logic or software may also be resident on an article of manufacture comprising a computer readable medium having computer readable program code embodied therein and being readable by the data storage device 925 and for causing the processor 910 to operate in accordance with the methods and teachings herein.

The present invention may also be embodied in a handheld or portable device containing a subset of the computer hardware components described above. For example, the handheld device may be configured to contain only the bus 915, the processor 910, and memory 950 and/or 925. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 910. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer implemented identity protection system comprising:
   a memory to:
   store a plurality of user passwords; and
   a processor coupled with the memory to:
      provide a dashboard for user identity protection of a plurality of digital identities associated with the user for a plurality of different online service providers, which includes at least one identity tool to evaluate at least one security state of a user outside the computer, collect biometric security data with a biometric security mechanism to ensure that only the user can access the dashboard, the biometric security mechanism tying the user's physical biometric data to the plurality of digital identities, and display a password security state in the dashboard that is indicative of an overall password strength score associated with the plurality of user passwords stored in the memory, the plurality of user passwords corresponding to the plurality of different online service providers, wherein the overall password strength score is calculated from a plurality of individual password strength scores and a combined password strength score, the plurality of individual password strength scores determined by a password evaluator that evaluates a strength of each of the plurality of saved user passwords separately and the combined password strength score determined by a combined password evaluator that evaluates a strength of the plurality of saved user passwords in conjunction with each other.

2. The system of claim 1, wherein the identity tool comprises a credit protection service.

3. The system of claim 2, wherein the credit protection service comprises: a credit monitoring service which provides one or more of: credit reports, credit scores, credit locks, and account access records.

4. The system of claim 2, wherein the credit protection service comprises a onetime credit card number generator provided by a third party, to enable the user to generate a onetime credit card number and utilize it for purchases.

5. The system of claim 1, wherein the identity tool comprises a data protection tool, the data protection providing one or more of: a file time stamp service, a virtual safe deposit box, and communications linking mechanism to link communications with a validated user identity.

6. The system of claim 1, further comprising:
   an identity browser providing a snapshot of the user's digital identities, and categorizing tools by various types of identities.

7. The system of claim 6, wherein the identities comprise one or more of: online identities, healthcare identities, financial identities, credit identities, and social networking identities.

8. A computer-implemented method comprising:
   providing, with a computer processing system, a dashboard for user identity protection of a plurality of digital identities associated with the user for a plurality of different online service providers, which includes at least one identity tool to evaluate at least one security state of a user outside the computer;
   collecting biometric security data with a biometric security mechanism, the biometric security mechanism to ensure that only the user is provided the dashboard, the biometric security mechanism tying the user's physical biometric data to the plurality of digital identities; and
   displaying, with the computer processing system, a password security state in the dashboard, wherein the password security state is indicative of an overall password strength score associated with the plurality of user passwords, the plurality of user passwords corresponding to the plurality of different online service providers, wherein the overall password strength score is calculated from a plurality of individual password strength scores and a combined password strength score, the plurality of individual password strength scores determined by a password evaluator that evaluates a strength of each of the plurality of saved user passwords separately and the combined password strength score determined by a combined password evaluator that evaluates a strength of the plurality of saved user passwords in conjunction with each other.

9. The computer-implemented method of claim 8, wherein the identity tool comprises a credit protection service.

10. The computer-implemented method of claim 9, wherein the credit protection service comprises: a credit monitoring service which provides one or more of: credit reports, credit scores, credit locks, and account access records.

11. The computer-implemented method of claim 9, wherein the credit protection service comprises a onetime credit card number generator provided by a third party, to enable the user to generate a onetime credit card number and utilize it for purchases.

12. The computer-implemented method of claim 8, wherein the identity tool comprises a data protection tool, the data protection providing one or more of: a file time stamp service, a virtual safe deposit box, and communications linking mechanism to link communications with a validated user identity.

13. The computer-implemented method of claim 8, further comprising:
   providing, with an identity browser, a snapshot of the user's digital identities, and categorizing tools by various types of identities.

14. The computer-implemented method of claim 13, wherein the identities comprise one or more of: online identities, healthcare identities, financial identities, credit identities, and social networking identities.

* * * * *